United States Patent [19]

Lagerberg

[11] Patent Number: 5,716,053
[45] Date of Patent: Feb. 10, 1998

[54] SEALING PLUG FOR MACHINE TOOLS

[75] Inventor: Stig Lagerberg, Sandviken, Sweden

[73] Assignee: Sandvik AB, Sandviken, Sweden

[21] Appl. No.: 705,989

[22] Filed: Aug. 30, 1996

[30] Foreign Application Priority Data

Aug. 31, 1995 [SE] Sweden ............ 9503003

[51] Int. Cl.$^6$ ............ F16J 15/10
[52] U.S. Cl. ............ 277/70; 277/207 R; 277/207 A; 277/212 F; 277/214
[58] Field of Search ............ 277/9, 11, 70, 277/207 R, 207 A, 212 R, 212 F, 214, 225; 411/369, 370, 510, 542, 915; 285/345, 351

[56] References Cited

U.S. PATENT DOCUMENTS

| | | | |
|---|---|---|---|
| 1,125,067 | 1/1915 | Cook | 285/345 |
| 2,729,474 | 1/1956 | Unger | 277/225 |
| 3,941,109 | 3/1976 | Schmid | 285/345 |
| 4,066,281 | 1/1978 | De Bonis | 285/351 |
| 4,175,757 | 11/1979 | Emmerich | 277/212 F |
| 5,020,946 | 6/1991 | Nann | 277/212 F |
| 5,024,469 | 6/1991 | Aitken et al. | 285/351 |
| 5,402,696 | 4/1995 | Hecht et al. | 82/158 |

*Primary Examiner*—William A. Cuchlinski, Jr.
*Assistant Examiner*—John L. Beres
*Attorney, Agent, or Firm*—Burns, Doane, Swecker & Mathis, L.L.P.

[57] ABSTRACT

A sealing plug is insertable into a rear end of a cutting shaft on which a cutting insert is mounted. The plug forms an internal passage for conducting cooling liquid to a center duct of the shaft. The plug includes a sleeve portion insertable into the duct, and a radial flange which supports an elastically flexible sealing member that can be removed. The sealing plug is capable of multiple uses, e.g., a first use wherein the cutting shaft is mounted within an adapter and the sealing member seals radially outwardly against a surface of the adapter, and a second use wherein the cutting shaft is mounted in an open-ended bore of a holder (i.e., no adapter is used), the sealing member is removed, and sealing is effected by a tight-fit of the sleeve portion within the duct of the cutting shaft. By removing the sealing member, the maximum outer diameter of the plug is reduced to facilitate movement of the cutting shaft through the bore of the holder.

1 Claim, 3 Drawing Sheets

SEALING PLUG FOR MACHINE TOOLS

TECHNICAL FIELD OF THE INVENTION

This invention relates to a sealing plug for machine tools, e.g., lathe bars of the kind which comprises a shaft having, at a first end, a seat for a cutting insert, and an axial through-duct for conducting cooling liquid to the seat. The duct opens, on one hand, in the area of the first end of the shaft, and on the other hand, in an end surface at the opposite, second end of the shaft. The shaft is of a cylindrical shape except for a number of plane surfaces, and the plug comprising a sleeve-shaped member having an internal threading intended to receive an externally threaded hose nipple. The plug is usable in two applications. In a first application, the shaft is fixed in a holder with not only the first end but also the second end thereof freely exposed, there being a generally ring-shaped sealing member radially projecting from the sleeve member of the plug for the purpose of sealing against the inside of a bore. In a second application, the shaft is inserted in an adapter having a closing end wall which, together with the end surface of the shaft, defines a cavity to which cooling liquid is conducted through a conduit connected to the adapter.

BACKGROUND OF THE INVENTION AND PRIOR ART

Tools of the kind which are composed of an elongated shaft and at least one detachable, replaceable cutting insert at a frontal end of the shaft are frequently used in lathes, e.g., turret lathes, and are then designated lathe bars. In connection with turning, there are two principal cases or applications of use. In a first case, the tool shaft is fixed by means of screws in a holder, e.g., on a turnable disc of a turret lathe, in such a way that the two opposite ends of the shaft protrudes from the holder. In this case, the necessary cooling liquid conduit in the form of a hose may be directly connected to the freely exposed rear end of the shaft.

In a second case of use, the shaft is applied in a particular adapter which, in turn, is fixed in a suitable way in lathe. The adapter consists of a generally cylinder-shaped housing having an internal, cylindrical bore which is open at a front end and closed by means of a gable wall at the opposite rear end of the housing. In this case, the cooling liquid must first be conveyed to the internal cavity of the housing and then to the duct inside the shaft. However, in doing so, a problem arises in that the shaft (the outside of which has a generally cylindrical shape corresponding to the cylindrical shape of the internal bore of the adapter-housing) has a number of plane surfaces (usually three) against which fixing screws may be tightened. By the presence of these plane surfaces, there is formed, between the outside of the shaft and the cylindrical bore of the housing, a number of cross-section-wise segmental channel spaces through which the cooling liquid would leak out unless the spaces are sealed off.

In this connection, it should also be pointed out, that the shaft is made by cutting a long shaft to a shorter length when is suitable for the individual need. More precisely, the rear end of the shaft is cut off. For this reason, it is not practically possible for the shaft manufacturer to provide the shaft with any permanent sealing in the area of the rear end of the shaft, or to form a thread for a hose nipple in the rear end of the cooling liquid duct.

For the purpose of solving the above-mentioned problems, there has been proposed in U.S. Pat. No. 5,402,696 a sealing plug of the kind initially referred to. In this case, the ring-shaped sealing member consists of a radial flange made integrally with the sleeve member, as well as a mainly cylindrical, elastically resilient skirt projecting backwards from the periphery of the flange. In practice, the plug in its entirety is made of plastics, the skirt being given an outer diameter which is at least a few tenth of a millimeter larger than the outer diameter of the shaft and the inner diameter of adapter-bore respectively. When the shaft is inserted with its rear, second end in an adapter, the cooling liquid brought to the cavity of the adapter brings about a certain overpressure which, in combination with the enlarged diameter of the skirt guarantees that the skirt is resilient pressed against the inside of the cylindrical bore of the adapter and sealing against the same. In this way, the cooling liquid receiving cavity is sealed off against the cross-section-wise segmental spaces formed between the plane surfaces of the shaft and the bore.

When the shaft is used in a different application, i.e., in a holder with the rear end thereof freely exposed, the resilient sealing skirt is inactive. In this case, a hose nipple is screwed into the sleeve member of the plug, the proper sleeve member being squeezed in place and sealing against the inside of the cooling liquid duct in the shaft.

An advantage of the sealing plug according to U.S. Pat. No. 5,402,696 is therefore that the same is universally usable independently of whether the tool is applied in an adapter or in a holder.

However, it has turned out that the known sealing plug is also associated with disadvantages, especially when the tool is used in a holder of the above-mentioned kind. When the tool is used in an adapter, dismounting and changes occur relatively seldom, but when the tool is used in a holder of a turret lathe, tool changing may at times occur often. In doing so, the elastic skirt constitutes a worry in that the same in a tension-free state has a diameter which is larger than the bore of the holder through said the skirt has to be passed. Once the plug has been applied in the cooling liquid duct, the plug usually sits so firmly that it may be removed only with difficulty. Since the skirt has a larger diameter than the bore of the holder, it is difficult to conduct said skirt through the bore in connection with repeated tool changes.

Another disadvantage of the known plug, which is made in one single piece of plastics, is that the choice of material becomes tricky in that the skirt has to be soft and elastically resilient so as to seal reliably against the bore of the adapter at the same time as the sleeve member and other parts of the sealing member shall be strong and resistant. To combine these characteristics in one and the same plug body of only one common material is plastic-technically difficult.

OBJECTS AND FEATURES OF THE INVENTION

The present invention aims at removing the above-mentioned disadvantages of the sealing plug known by U.S. Pat. No. 5,402,696 and at creating an improved sealing plug. Thus, a basic object of the invention is to create a sealing plug which may be smoothly mounted in and dismounted from holders of turret lathes at the same time as the plug guarantees a good sealing effect in connection with application in adapters. Furthermore, the plug should be possible to manufacture in a rational way without difficult choices of material.

DETAILED DESCRIPTION OF PREFERRED EMBODIMENTS OF THE INVENTION

Figure 1:
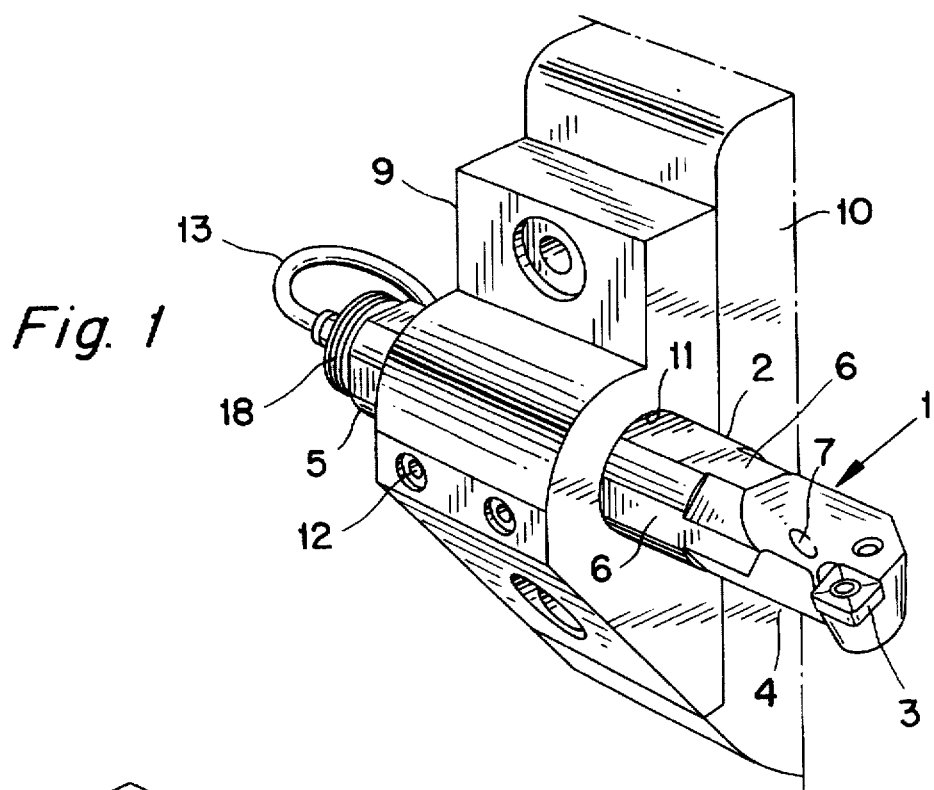
FIG. 1 is a perspective view illustrating a lathe bar mounted in a holder on the turnable disc of a turret lathe, there being provided a sealing plug according to the present invention.
Figure 2:
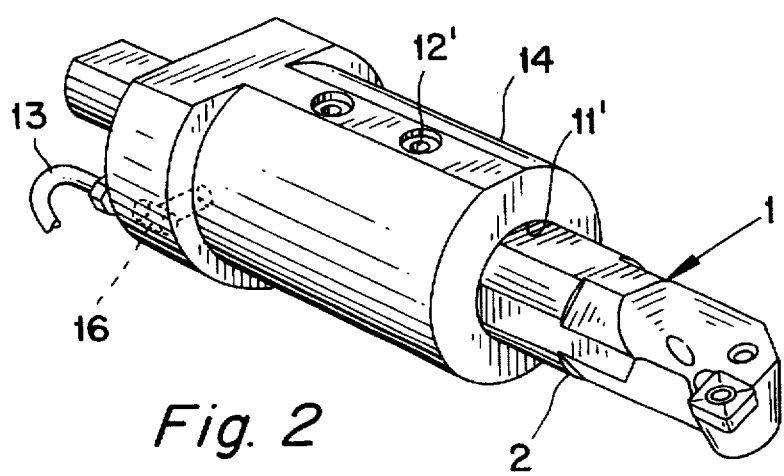
FIG. 2 is a perspective view illustrating a lathe bar mounted in an adapter, the sealing plug being hidden from view.
Figure 3:
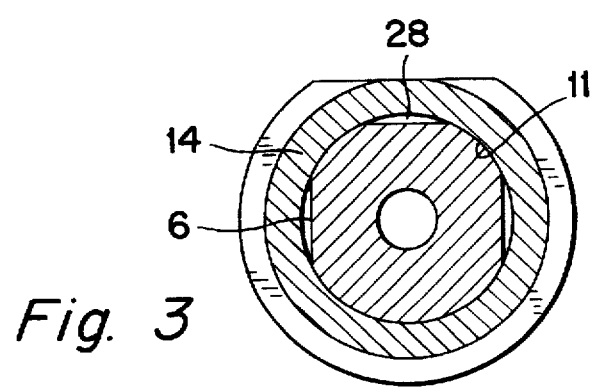
FIG. 3 is a cross section through the adapter and the lathe bar account to FIG. 2.

In FIGS. 1–3, reference numeral 1 generally designates a machine tool in the form of a lathe bar which comprises a shaft 2 and a cutting insert 3 placed in a seat at a first shaft end designated by numeral 4. The opposite end of the shaft is designated by numeral 5. The shaft 2 is of a generally cylindrical shape, but has a number of plane surfaces 6. Usually, the shaft has three such plane surfaces. Suitably centrally through the shaft 2 an axial duct 7 extends which opens, on one hand, in the area of the first end 4 of the shaft, and, on the other hand, in an end surface 8 (see also FIG. 7) at the opposite end of the shaft.

In the first case of use, which is illustrated in FIG. 1, the shaft 2 is mounted in a holder 9 which may be placed on the turnable and adjustable disc 10 of a turret lathe. The holder 9 has the shape of a block having a cylindrical through-bore 11 which is open at opposite ends. The tool shaft is fixed by means of screws (not shown) which are tightened in hole 12 in the holder block 9. More precisely, the fixing screws are tightened against a suitable plane surface 6. From FIG. 1 it is clearly evident how the two opposite ends of the shaft 2 project from the holder block 9 and are freely exposed. This means that a cooling liquid conduit in the form of a hose 13 may be directly connected to the rear end of the shaft.

FIG. 2 illustrates a second case of use when the shaft 2 is applied in an adapter 14. Also, the adapter 14 has an internal, cylindrical bore 11' and holes 12' for screws by means of which the shaft may be fixed in the adapter. However, in this case, the bore 11' is closed at the rear end thereof, more precisely by means of an end wall 15 (see FIG. 5). Therefore, it is not possible to connect the cooling liquid conduit 13 directly to the rear end of the shaft 2. Instead, the conduit 13 is connected to a passage in the shape of borings 16 in the adapter housing which communicate with the cavity designated 17 in FIG. 5. This cavity is defined between the end wall 15 and the rear end surface of the shaft 2.

Figure 4:
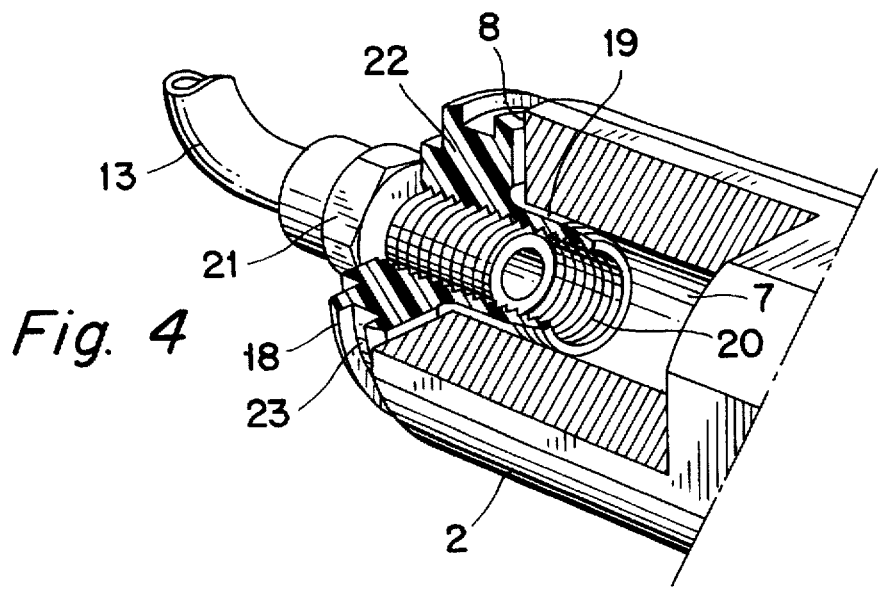
FIG. 4 is a cut perspective view illustrating the sealing plug according to the invention in connection with the first case of use when the lathe bar is mounted in the holder accounting to FIG. 1.
Figure 5:
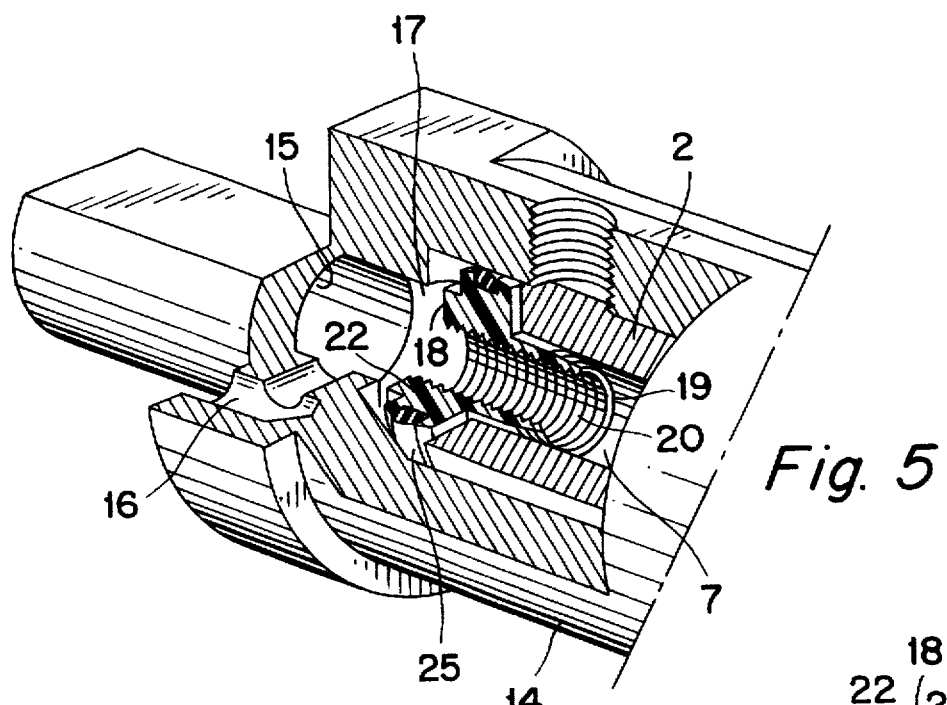
FIG. 5 is a cut perspective view in a corresponding way illustrating the second case of use when the lathe bar is mounted in the adapter according to FIG. 2.
Figure 6:
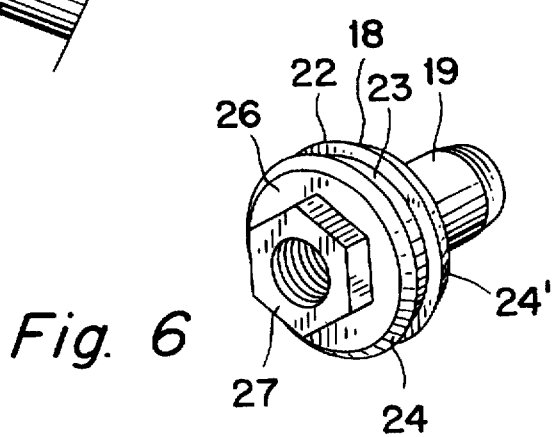
FIG. 6 is a perspective view of the plug without the detachable sealing element thereof.

Reference is now made to FIGS. 4–6 illustrating a sealing plug according to the invention, which plug is in its entirety designated 18. This plug comprises a hollow sleeve-shaped member 19 having an external cylindrical surface and internal liquid-conducting passage defined by an internal surface on which there is formed an internal thread 20 intended to receive an external thread on a nipple, in its entirety designated 21, on the cooling liquid conduit 13. At the rear end of the sleeve member 19, a radially projecting, ring-shaped flange 22 is provided. More precisely, the flange 22 is made of plastics integrally with the sleeve member 19. The flange 22 has a peripheral, circumferential groove 23 defined between two axially separated cams or ridges 24, 24'. The ridges are formed with cone-shaped surfaces, the conicity of which are turned in opposite directions, the maximum diameter of the individual ridge in association with the bore not exceeding the outer diameter of the lathe bar 2. The purpose of the groove 23 is to receive a separate, detachable sealing element of an elastically resilient nature, more precisely in the other case of use as is shown in FIGS. 2 and 5. In practice, the sealing element may advantageously consist of an O-ring 25 the outer diameter of which in a tension-free state is at least somewhat larger than the outer diameter of the lathe bar. A substantial advantage of O-rings is that the same are cheap and can be kept available in large quantities.

Further, on a rear end surface 26 of the ring-flange, a projection 27 is provided which forms a key handle. In the example, the projection 27 is in the form of a hexagonal head which, in a conventional way, may be gripped by, e.g., a universal screw spanner. The projection 27 is provided integrally with the plug as a whole.

In FIG. 3 is shown how the plane surfaces 6 of the lathe bar 2 together with the internal bore 11 in the cylinder adapter 14 define cross-section-wise spaces 28 which extend along the length of the adapter housing. The purpose of the O-ring 25 is to seal off the space 17 from the gap spaces 28 so that the cooling liquid coming into the cavity 17 will not leak out.

The described sealing plug operates and is used in the following way.

In the first case of use which is illustrated in FIGS. 1 and 4, the O-ring 25 is removed from the groove 23. The sleeve member 19 of the plug is fully inserted in the cooling liquid duct 7, i.e., the ring-flange 22 abuts against the rear end surface 8 of the bar. In addition, the hose nipple 21 has been screwed into the plug. The thickness of the wall of the sleeve member 19 is made with a certain oversize meaning that when the threaded part of the nipple 21 is fixed in the plug, the material of the sleeve member will be compressed during the accomplishment of an effective squeezing action between the threaded part of the nipple and the inside of the cooling liquid duct. In other words, the plug is clamped in a steady and reliable way. In practice, this clamping will be so strong that the plug is steadily held in the duct 7 even after removal of the hose nipple. However, the fact that the sealing plug is held to the lathe bar even after removal of the nipple entails no problem at all in connection with the removal of the lathe bar from the holder 9, because the O-ring has been removed to reduce the maximum outer plug diameter, i.e., the outer diameter of the ring-flange 22 does not exceed the outer diameter of the lathe bar. In other words, the lathe bar may be removed from, as well as inserted into the holder without the ring-flange of the sealing plug coming in contact with the internal bore of the holder.

In this connection, it should also be emphasized that the screwing of the sealing plug into the cooling liquid duct of the bar is simple to carry out in spite of the fact that the outside of the sleeve member 19 is flat and abuts against the equally flat inside of the cooling liquid duct. Thus, the plug may, during the screwing operation, be reliably kept in a given position by means of a key which is applied on the projection 27 shaped with plane gripping surfaces.

In the second case of use which is illustrated in FIGS. 2 and 5, the O-ring 25 is mounted in the groove 23. In this case, the sleeve member 19 of the plug is pressed into the cooling liquid duct of the bar so that the plug holds to the bar, and then the bar is inserted in the internal bore 11' of the adapter housing. When inserted, the O-ring 25 is compressed against a wall of the bore 11' while guaranteeing a good sealing effect. Finalliy, the bar is fixed in the adapter by means of fixing screws in the holes 12'. In this state, cooling liquid may be supplied to the cavity 17 defined between the end wall 15 and the end surface of the lathe bar without liquid leaking out through the spaces 28, in that the spaces are sealed off against the cavity 17 by means of the O-ring 25.

Due to the fact that the particular sealing element in the form of the O-ring 25 is detachably connected to the proper plug, a considerable versatility is offered not only with regard to the choice of material but also with regard to the applicabilities because the O-ring is only used when the sealing effect is required in the adapter housing, but may be removed when the O-ring would constitute a hindrance, namely in connection with the mounting and dismounting of the lathe bar in the first case of use.

Although the presence of the O-ring when inserting the shaft into the adapter 14 constitutes a hindrance, there is seldom a need to remove the shaft from an adapter, as noted earlier, so the presence of the O-ring does not constitute a major problem with regard to adapters.

Figure 7:
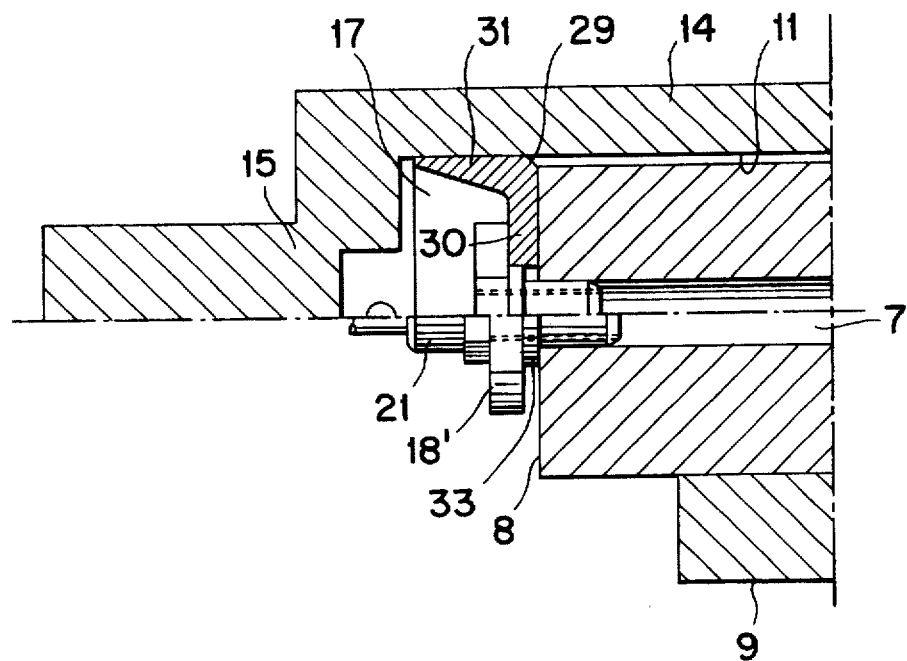
FIG. 7 is an enlarged longitudinal section illustrating an alternative embodiment of the sealing plug according to the invention in the two cases of use.
Figure 8:
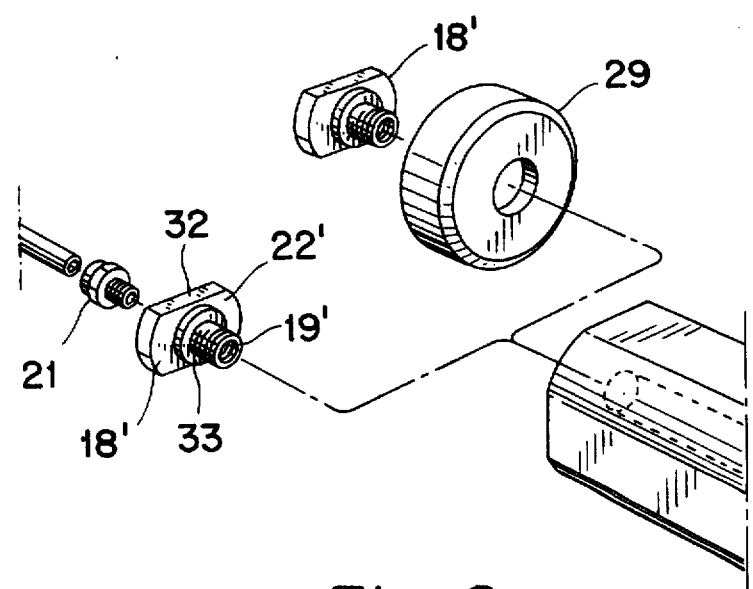
FIG. 8 is a perspective exploded view which further illustrates the alternative embodiment according to FIG. 7.

Reference is now made to FIGS. 7 and 8 which illustrate an alternative embodiment of the sealing plug according to the invention. Also in this case, the proper plug 18' comprises an internally threaded sleeve member 19' and a flange 22' projecting radially therefrom. A cross-section-wise mainly L-shaped ring 29 serves as a sealing element in this case, the ring comprising a radial material portion 30 as well as a skirt portion 31 projecting backwards from the periphery of the portion 30. The flange 22' has two plane surfaces 32 for application of a key. On the front side of the flange 22', a bead is provided, the thickness of which is somewhat less than that of the radial material portion 30 of the sealing ring 29.

The first case of use for the lathe bar and the plug is illustrated in the lower half of FIG. 7 as well as to the left in FIG. 8. In this case, the sealing ring 29 is removed, the hose nipple 21 being screwed into the sleeve member 18' while clamping the plug in the cooling liquid duct of the bar. In this case, the bead 33 abuts against the rear end surface 8 of the bar.

In the second case of use, which is illustrated in the upper half of FIG. 7 and to the right in FIG. 8. the elastic, soft sealing ring 29 is inserted between the flange 22' and the end surface 8 of the lathe bar, with the sleeve portion 19' being pressed into the cooling liquid duct 7. Advantageously, the skirt portion 31 has a diameter which is at least somewhat larger than the outer diameter of the lathe bar. The diameters of the skirt portion and the bar may, however, also be substantially equal. When cooling liquid is fed into the cavity 17, there arises a certain overpressure therein, contributing to pressing the skirt portion 31 against the internal bore 11 of the adapter 14.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. In combination:

an adapter having a cylindrical inner wall forming a bore which is open at a forward end thereof and closed at a rearward end thereof;

a shaft mounted in the bore and including a front end projecting forwardly from the forward end of the bore, and a rear end disposed in a cavity formed by the wall of the bore, the front end of the shaft having a seat adapted to carry a cutting insert, the shaft having a duct extending axially therethrough for supplying cooling fluid to the seat; and a sealing plug comprising:
      a one-piece element including:
      a hollow sleeve portion disposed in a rear end of the duct and having a passage for conducting cooling fluid to the duct, a wall of the passage being internally threaded, and
      a flange portion projecting radially outwardly from a rear end of the sleeve portion to an extent no farther than an outer diameter of the shaft, the flange portion including an annular, radially outwardly open groove; and an elastomeric annular sealing ring disposed in the groove and including a radially outwardly facing sealing surface having a diameter at least as large as an outer diameter of the shaft and adapted to bear sealingly against the cylindrical wall of the bore, the sealing ring being removable from the one-piece element to reduce the maximum outer plug diameter.

* * * * *